United States Patent [19]
Gotoh

[11] Patent Number: 4,658,164
[45] Date of Patent: Apr. 14, 1987

[54] VEHICLE GENERATOR

[75] Inventor: Hitoshi Gotoh, Himeji, Japan

[73] Assignee: Mitsubishi Denki Kabushiki Kaisha, Tokyo, Japan

[21] Appl. No.: 801,876

[22] Filed: Nov. 26, 1985

[30] Foreign Application Priority Data

Nov. 27, 1984 [JP]  Japan ............................ 59-180473[U]

[51] Int. Cl.$^4$ ................................................ H02K 5/00
[52] U.S. Cl. ........................................ 310/89; 310/45; 310/68 D; 310/71
[58] Field of Search ................... 310/68 R, 68 D, 71, 310/89, 91, 43, 45, 254, 263

[56] References Cited

U.S. PATENT DOCUMENTS

| | | | |
|---|---|---|---|
| 3,483,408 | 12/1969 | Frohmuller | 310/71 |
| 3,538,362 | 11/1970 | Cheetham | 310/71 |
| 3,539,850 | 11/1970 | Sato | 310/71 |
| 4,103,193 | 7/1978 | Ito | 310/68 D |

FOREIGN PATENT DOCUMENTS

| | | | |
|---|---|---|---|
| 0293914 | 2/1968 | Australia | 310/263 |
| 2349825 | 4/1974 | Fed. Rep. of Germany | 310/68 D |
| 2747229 | 4/1978 | Fed. Rep. of Germany | 310/68 D |
| 0032611 | 9/1971 | Japan | 310/68 D |

Primary Examiner—R. Skudy
Attorney, Agent, or Firm—Leydig, Voit & Mayer

[57] ABSTRACT

An improved vehicle generator designed so as to eliminate the need for any insulating tubes around the lead wires extending from a stator coil, thus facilitating the mechanization the assembly operations thereof. The generator has a windscreen of insulating material mounted on a rectifier which is disposed within the rear bracket of a generator housing, the windscreen being integrally formed with an insulating wall extending along the inner surface of the rear bracket so as to insulate the lead wires from the rear bracket.

4 Claims, 4 Drawing Figures

VEHICLE GENERATOR

BACKGROUND OF THE INVENTION

This invention relates to vehicle generators, and more particularly to an insulating structure for the lead wires of a stator coil.

In general, the lead wires of a stator coil of this kind are insulated by insulating tubes respectively fitted over the lead wires. With such an insulating structure, however, it is impossible to mechanize the process of fitting the insulating tubes over the lead wires due to their peculiar shape, and there are deficiences such as defective products resulting from the tubes falling off of the lead wires.

Now, a conventional insulating structure of this kind will be described in detail with reference to FIGS. 1 and 2 of the accompanying drawings. FIG. 1 generally shows portion of vehicular generator which comprises a rotor 10 arranged in a housing and rotatably supported by the opposite walls of the housing, and a stator 11 surrounding the rotor 10 and having a coil 12 with lead wires 13 extending therefrom, each lead wire being covered with an insulating tube 14 for protection purposes. The stator 11 is fixed to the housing by means of a metallic rear bracket 21 within which is disposed a rectifier assembly 30 including a rectifier 31. Secured to the rectifier 31 by screws etc. is a windscreen 32 having an L-shaped cross section which, as clearly shown in FIG. 2, is formed with three guide grooves 32a in spaced parallel relation with each other for guiding the lead wires 13 of the coil 12 protected by the insulating tubes 14.

With conventional generators as constructed in the above manner, the insulating tubes 14 are fitted over the respective lead wires 13 of the stator coil 12 so as to insulate and protect the lead wires 13 from the inner surface of the rear bracket 21. As a result, conventional generators have the following drawbacks. Namely, it is impossible to mechanize the assembly operation of putting the insulating tubes 14 over the lead wires 13 owing to their particular shape, and defective products often result from the insulating tubes falling off of the lead wires 13 of the coil 12.

SUMMARY OF THE INVENTION

In view of the above, the present invention is intended to obviate the above-mentioned drawbacks, and has for its object the provision of a novel and improved vehicle generator which eliminates the need for any insulating tubes around the lead wires, and thus facilitates the mechanization of assembly of the entire generator.

To the above end, according to the present invention, there is provided a vehicle generator which comprises a rotor rotatably arranged in a housing, a stator surrounding the rotor and having a coil with lead wires extending therefrom, a rear bracket for fixing the stator, a rectifier disposed within the rear bracket, and a windscreen of insulating material mounted on the rectifier and having an insulating wall, said insulating wall extending along the inner surface of the rear bracket so as to insulate the lead wires from the rear bracket.

BRIEF DESCRIPTION OF THE DRAWINGS

The above and other objects, novel features and advantages of the present invention will be more readily understood from the following description of a presently preferred embodiment thereof when taken in conjunction with the accompanying drawings, in which.

DETAILED DESCRIPTION OF THE PREFERRED EMBODIMENT

Now, the invention will be described in conjunction with a preferred embodiment thereof by referring to FIGS. 3 and 4 of the accompanying drawings.

Figure 1:
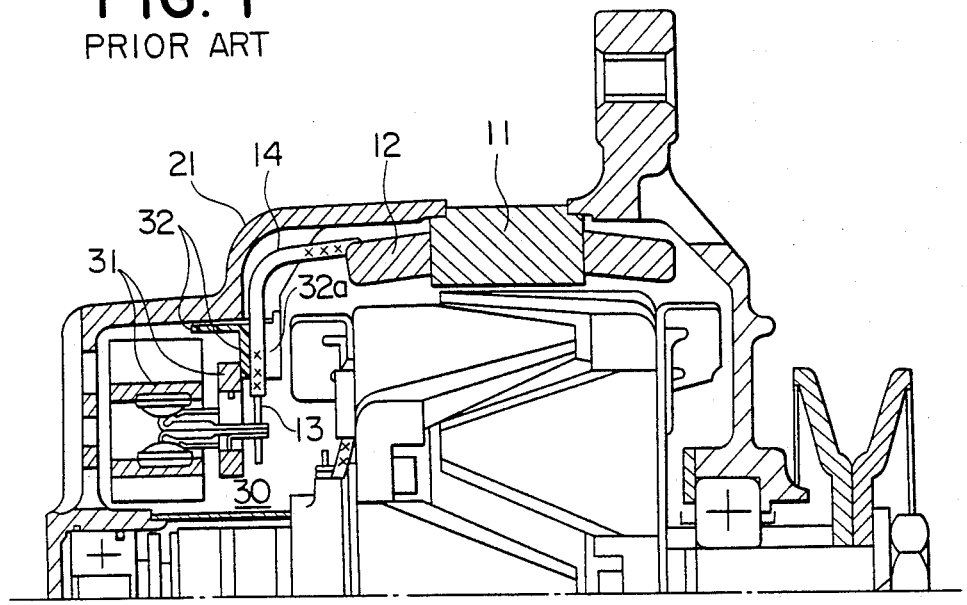
FIG. 1 is a sectional view showing the construction of a prior art vehicle generator.
Figure 2:
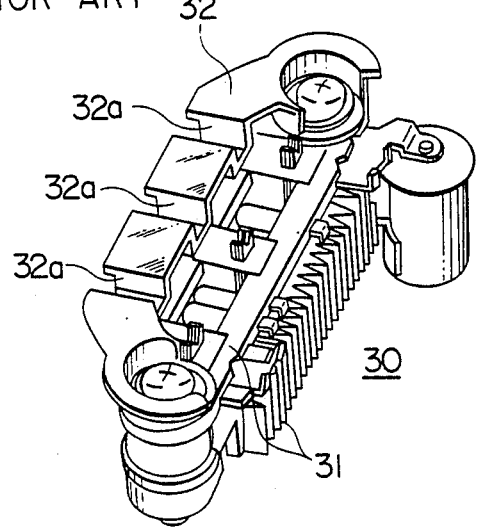
FIG. 2 is a perspective view showing the rectifier of FIG. 1.

In these Figures, the same or corresponding parts of the illustrated embodiment are represented by the same reference numerals as those employed in the prior art show in FIGS. 1 and 2.

Figure 3:
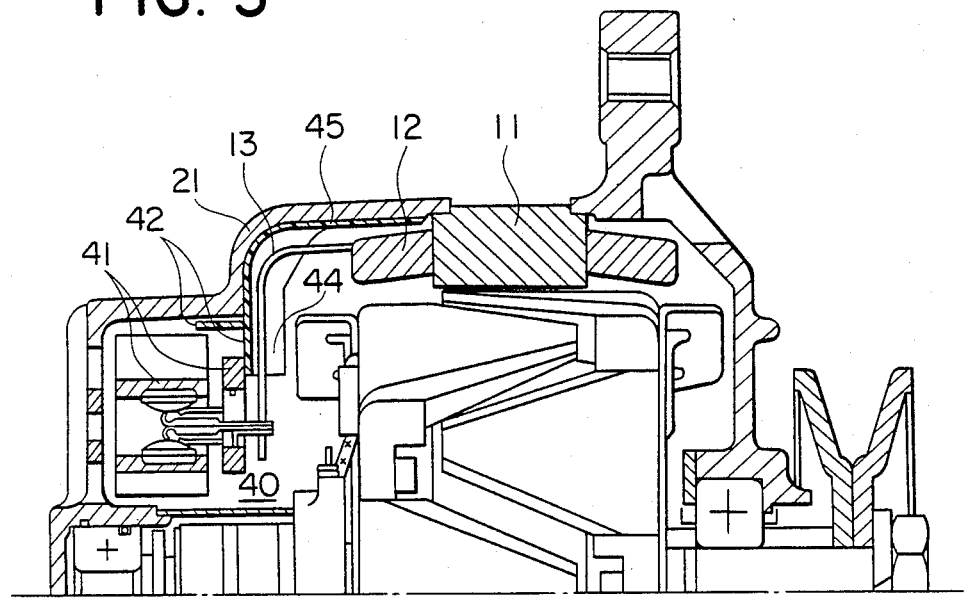
FIG. 3 is a sectional view of a vehicular generator constructed in accordance with the present invention.
Figure 4:
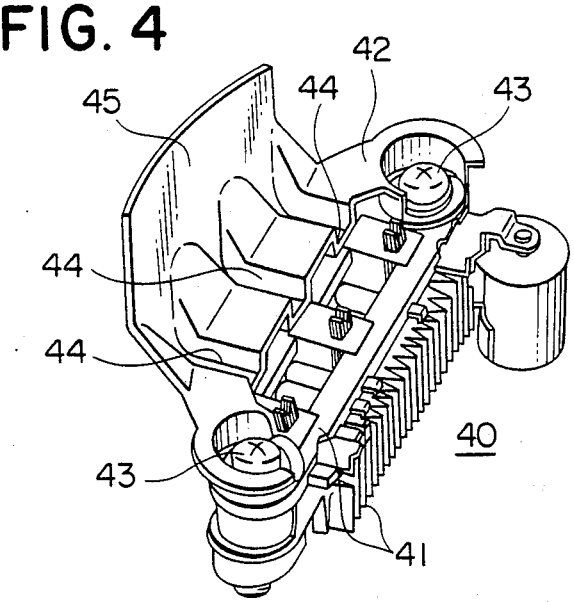
FIG. 4 is a perspective view showing the rectifier of FIG. 3.

As shown in FIGS. 3 and 4 in which a vehicle generator of the present invention is illustrated, the vehicle generator comprises a rectifier assembly 40 different from the conventional rectifier assembly shown in FIG. 2. The rectifier assembly 40 comprises a rectifier 41 and an electrically insulating windscreen 42 mounted on the rectifier 41 by screws 43. The rectifier 41, which is the same as the rectifier 31 shown in FIGS. 1 and 2, may be disposed within and fixedly secured to the rear bracket 21. The windscreen 42 has formed therein three guide grooves 44 similar to those shown in FIG. 2 for guiding and accommodating therein the lead wires 13 connected between the stator coil 12 and the rectifier 41. The guide grooves 44 may be integrally moulded in the windscreen 42. According to the present invention, the windscreen 42 has an integrally formed, electrically insulating wall 45 which extends, when assembled in the generator, substantially along the inner surface of the metallic rear bracket 21 to cover the inner surface of the rear bracket 21 along which the lead wires 13 connected between the coil 12 and the rectifier 41 extend. Thus, in the illustrated embodiment, the insulating wall 45 integrally extends from the windscreen 42 in the radial direction of the generator, curved along the curved inner surface of the rear bracket 21, and further extends in the axial direction of the generator along the cylindrical surface of the rear bracket 21. Therefore, in the assembled state, the lead wires 13 cannot directly contact with the rear bracket 21 due to the insulating wall 45 disposed between the rear bracket 21 and the lead wires 13.

With the provision of the insulating wall 45 as constructed above, since the electrically insulating wall 45 is provided between the lead wires 13 and the rear bracket 21, it is possible to omit the insulating tubes which were employed in the prior art construction shown in FIGS. 1 and 2 for insulating and protecting the lead wires of the stator coil from the inner surface of the rear bracket. As a consequence, it becomes easy to mechanize the assembly operations of the entire device, and such inconveniences as defective products resulting from the tubes falling off of the lead wires can be avoided.

Here, it is to be noted that although in the illustrated embodiment, the guide grooves 44 for guiding the lead wires 13 of the stator coil 12 are formed in the windscreen 42 alone, such guide grooves may likewise be formed in the insulating wall 45 so as to retain and guide the lead wires 13 of the coil 12, so that the lead wires 13 can be more securely protected from the inner surface of the rear bracket 21.

As described in the foregoing description, according to the present invention, the windscreen of an insulating material mounted on the rectifier extends along the inner surface of the rear bracket so as to insulate the lead wires of the stator coil. This construction makes it unnecessary to employ any insulating tubes for the lead wires, thus facilitating the mechanization of the assembly operations of the entire generator and at the same time avoiding such inconveniences as defective products due to the insulating tubes falling off of the lead wires.

What is claimed is:

1. A vehicle generator comprising a rotor rotatably arranged in a housing, a stator surrounding said rotor and having a coil with lead wires extending therefrom, metallic rear bracket for fixing said stator, a rectifier disposed within said rear bracket, and a windscreen of an electrically insulating material mounted on said rectifier and having an electrically insulating wall, said insulating wall extending substantially along the inner surface of said rear bracket so as to insulate said lead wires of said stator coil from said rear bracket.

2. A vehicle generator as claimed in claim 1 wherein said windscreen is formed with guide grooves for retaining and guiding said respective lead wires.

3. A vehicle generator claimed in claim 2 wherein said guide grooves in said windscreen extend along said insulating wall.

4. A vehicle generator as claimed in claim 2 wherein said guide grooves are integrally moulded in said windscreen.

* * * * *